United States Patent
Eber

(10) Patent No.: US 10,511,742 B2
(45) Date of Patent: Dec. 17, 2019

(54) PRIVATE INFORMATION MANAGEMENT SYSTEM AND METHODS

(71) Applicant: DISH Technologies L.L.C., Englewood, CO (US)

(72) Inventor: Samuel Eber, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 150 days.

(21) Appl. No.: 15/041,475

(22) Filed: Feb. 11, 2016

(65) Prior Publication Data

US 2017/0237736 A1 Aug. 17, 2017

(51) Int. Cl.
| | | |
|---|---|---|
| *H04L 29/00* | (2006.01) | |
| *H04N 1/44* | (2006.01) | |
| *H04L 29/06* | (2006.01) | |
| *H04B 5/00* | (2006.01) | |

(52) U.S. Cl.
CPC .............. *H04N 1/44* (2013.01); *H04B 5/0031* (2013.01); *H04L 63/0861* (2013.01); *H04L 63/0869* (2013.01); *H04L 63/0876* (2013.01)

(58) Field of Classification Search
CPC ............... H04L 63/083; H04L 63/0861; H04L 63/0428; H04L 63/10; H04B 5/0031; G06K 7/1417; H04N 1/44
See application file for complete search history.

(56) References Cited

U.S. PATENT DOCUMENTS

| | | | | |
|---|---|---|---|---|
| 6,970,836 B1* | 11/2005 | Paltenghe | ............... | G06Q 20/02 380/286 |
| 8,086,688 B1* | 12/2011 | Bacastow | ............. | G06F 21/305 709/213 |
| 8,327,450 B2* | 12/2012 | Clement | ............ | G07C 9/00103 713/189 |
| 2006/0111097 A1* | 5/2006 | Fujii | ....................... | H04L 63/08 455/420 |
| 2006/0183505 A1* | 8/2006 | Willrich | ................ | G06F 1/1616 455/566 |
| 2009/0205036 A1* | 8/2009 | Slaton | .................... | H04L 63/083 726/9 |
| 2013/0166445 A1* | 6/2013 | Isaacson | ............ | G06Q 30/0234 705/41 |
| 2014/0108799 A1* | 4/2014 | Wang | ..................... | G06F 21/32 713/168 |
| 2014/0195633 A1* | 7/2014 | Carter | .................... | G06F 16/113 709/213 |
| 2014/0335789 A1* | 11/2014 | Cohen | ................... | H04W 8/005 455/41.2 |
| 2015/0302225 A1* | 10/2015 | Gluck | .................. | G06Q 20/352 235/440 |

(Continued)

*Primary Examiner* — Joseph P Hirl
*Assistant Examiner* — Chi D Nguy

(57) ABSTRACT

In some embodiments, a method is provided for storing data in a storage device associated with a first electronic device. The first electronic device can receive a request for data from a remote electronic device. The request for data can include pairing information, which can be used to confirm the remote electronic device as an approved paired device. The request for data can also include authentication information, which can be used to authenticate the request for data. The first electronic device can retrieve the data from the storage device and transmit the data in encrypted form to the remote electronic device.

18 Claims, 10 Drawing Sheets

(56) References Cited

U.S. PATENT DOCUMENTS

| | | | |
|---|---|---|---|
| 2016/0057223 A1* | 2/2016 | Puharre | H04L 67/1097 |
| | | | 709/219 |
| 2016/0063483 A1* | 3/2016 | Gula | G06Q 20/34 |
| | | | 705/41 |
| 2016/0099814 A1* | 4/2016 | Negi | H04L 9/0841 |
| | | | 713/171 |
| 2016/0188801 A1* | 6/2016 | Tse | G06F 21/6263 |
| | | | 705/51 |
| 2016/0275285 A1* | 9/2016 | Childress | G06F 21/44 |
| 2017/0187527 A1* | 6/2017 | Gauda | H04L 9/0897 |
| 2017/0331621 A1* | 11/2017 | Wikman | H04L 9/0819 |

\* cited by examiner

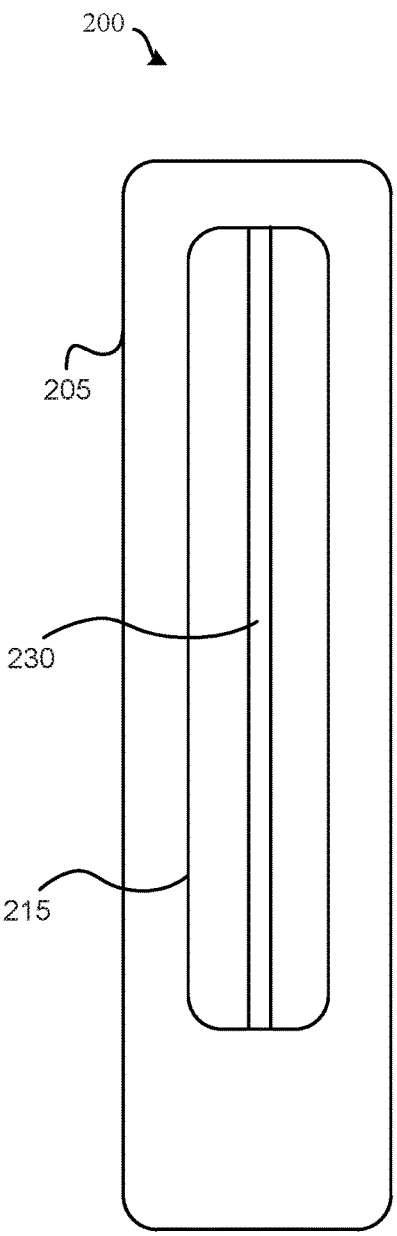 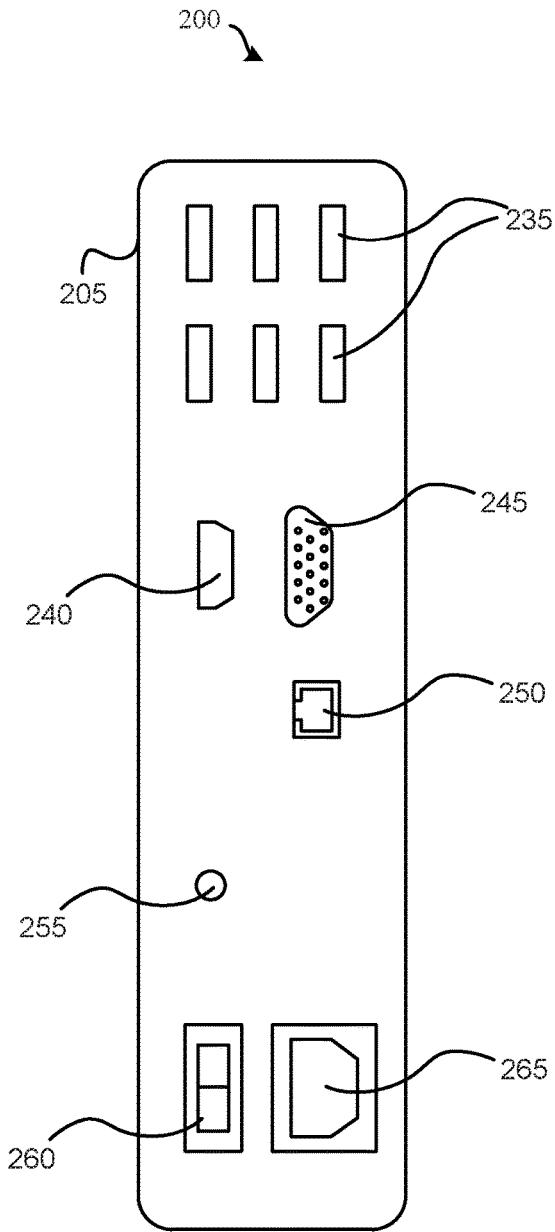
FIG. 2B  FIG. 2C

PRIVATE INFORMATION MANAGEMENT SYSTEM AND METHODS

BACKGROUND

A typical individual has countless types of information associated with themselves. For example, any given individual may have a birth certificate, a social security card, a driver license, a passport, a marriage license and certificate, a divorce decree, multiple credit cards, multiple debit cards, multiple gift cards, one or more credit history reports, bank account numbers, online user names and passwords, insurance documents for homes and vehicles, titles for homes and vehicles, medical insurance cards, medical files or information, store rewards cards, a last will and testament, a living will, medical directives, and many other diverse types of information. This kind of information is often private, personally identifying, and too voluminous to carry on one's person, yet sometimes needed when one is not at home (or wherever the information is kept) or in a position to look the information up. Because of the personal nature of the information, most individuals are concerned about the security of this information. Further, because of the varying nature and volume of the information, organizing this information can be difficult. Additionally, remote access to the information if often impossible, particularly when the documents and information are stored in a safe or safety deposit box. Therefore, there is a need for a system that can solve the foregoing issues.

SUMMARY

In some embodiments, a method for secure communication may be provided including storing, by a first electronic device, data in a storage device associated with the first electronic device. The method may further include receiving, at the first electronic device, a request for data from a remote electronic device. The data request can include pairing information and authentication information. The method may further include, confirming, by the first electronic device, using the pairing information, that the remote electronic device is an approved paired device. The method may further include authenticating, by the first electronic device, the request for data using the authentication information. The method may further include transmitting, by the first electronic device, the requested data in encrypted form, to the remote electronic device.

Embodiments of such a method may include one or more of the following features: receiving, at the first electronic device, a request to pair from the remote electronic device. The request to pair can include the pairing information, and the pairing information can include unique information associated with the remote electronic device. The method may include approving, at the first electronic device, the request to pair from the remote electronic device. The method may include transmitting a signal indicating the approval from the first electronic device. The method may include storing, by the first electronic device in the storage device, the pairing information and a designation that the remote electronic device is an approved paired device. The method may further include wherein the pairing information includes a media access control address ("MAC address") of the remote electronic device.

The method may further include wherein a communication protocol is used over a communication network to receive the request to pair and to transmit the signal indicating the approval. The method may include wherein the first electronic device is in physical proximity with the remote electronic device for the receiving the request to pair operation, approving the request to pair operation, and the transmitting a signal indicating the approval operation.

The method may further include wherein a communication protocol is used over a communication network to receive the request to pair and to transmit the signal indicating the approval. The method may include wherein the communication network is a home network. The method may further include wherein the communication protocol is near field communication ("NFC"). The method may further include providing a quick response code ("QR code") associated with the first electronic device that, when scanned by the remote electronic device causes the remote electronic device to initiate the request to pair. The method may further include wherein the authentication information includes biometric information.

The method may further include scanning a document with a document scanner using the first electronic device. The method may include storing, by the first electronic device, data obtained by the scan of the document in the storage device associated with the first electronic device. The method may further include scanning a card with a card reader using the first electronic device. The card may have a magnetic strip readable by the card reader. The method may include storing, by the first electronic device, data obtained by the scan of the card in the storage device associated with the first electronic device. The method may further include receiving, at the first electronic device, an audio signal from a microphone associated with the first electronic device. The method may include storing, by the first electronic device, data obtained from the audio signal in the storage device associated with the first electronic device. The method may further include receiving over a network at the first electronic device, data from a second electronic device. The method may include storing, by the first electronic device, the data received from the second electronic device in the storage device associated with the first electronic device.

The method may further include encrypting, by the first electronic device, the data prior to storing the data in the storage device. The method may further include wherein a password is required to unlock the requested data at the remote electronic device.

In some embodiments, a system for categorizing data may be provided including a storage device. The system may include a processor. The system may include a memory coupled with and readable by the processor and having stored therein a sequence of instructions which, when executed by the processor, cause the processor to perform one or more of the following: receive data from an input device. The data may have a data type and an owner. The instructions may also cause the processor to determine, based on the data, the data type. The instructions may also cause the processor to assign a category to the data based on the data type and the owner. The instructions may also cause the processor to store the data in the storage device according to the category.

Embodiments of such a system may include one or more of the following features: instructions that may also cause the processor to receive a data request from a remote electronic device. The data request may include a requested category and authentication information. The instructions may also cause the processor to authenticate the data request using the authentication information. The instructions may also cause the processor to retrieve the requested data from the storage device using the requested category. The instructions may also cause the processor to transmit, in encrypted form, the requested data to the remote electronic device.

The instructions may also cause the processor to identify the requestor based on the authentication information. The instructions may also cause the processor to determine the requestor has permission to receive data owned by the owner. The instructions may also cause the processor to transmit, in encrypted form, the category of the data. The instructions may also cause the processor to encrypt the data prior to storing the data in the storage device. The instructions may also cause the processor to identify a release from the owner providing the requestor permission to access the data.

BRIEF DESCRIPTION OF THE DRAWINGS

FIG. 2B illustrates an alternate view of the embodiment of the secure private information management device illustrated in FIG. 2A.

FIG. 2C illustrates another alternate view of the embodiment of the secure private information management device illustrated in FIG. 2A.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ability to access personal information from a single source in a secure manner can be useful in many cases. While most people have tax documents, a marriage license and certificate, a divorce decree, a driver license, a vehicle title, a social security number, a credit report, a birth certificate, a house deed, insurance information, medical files or information, username and password lists, and information about their children including birth certificates, social security numbers, school identification numbers, and so forth, there is no single, secure storage location for the information that can be easily accessed when the information is needed.

Figure 1:
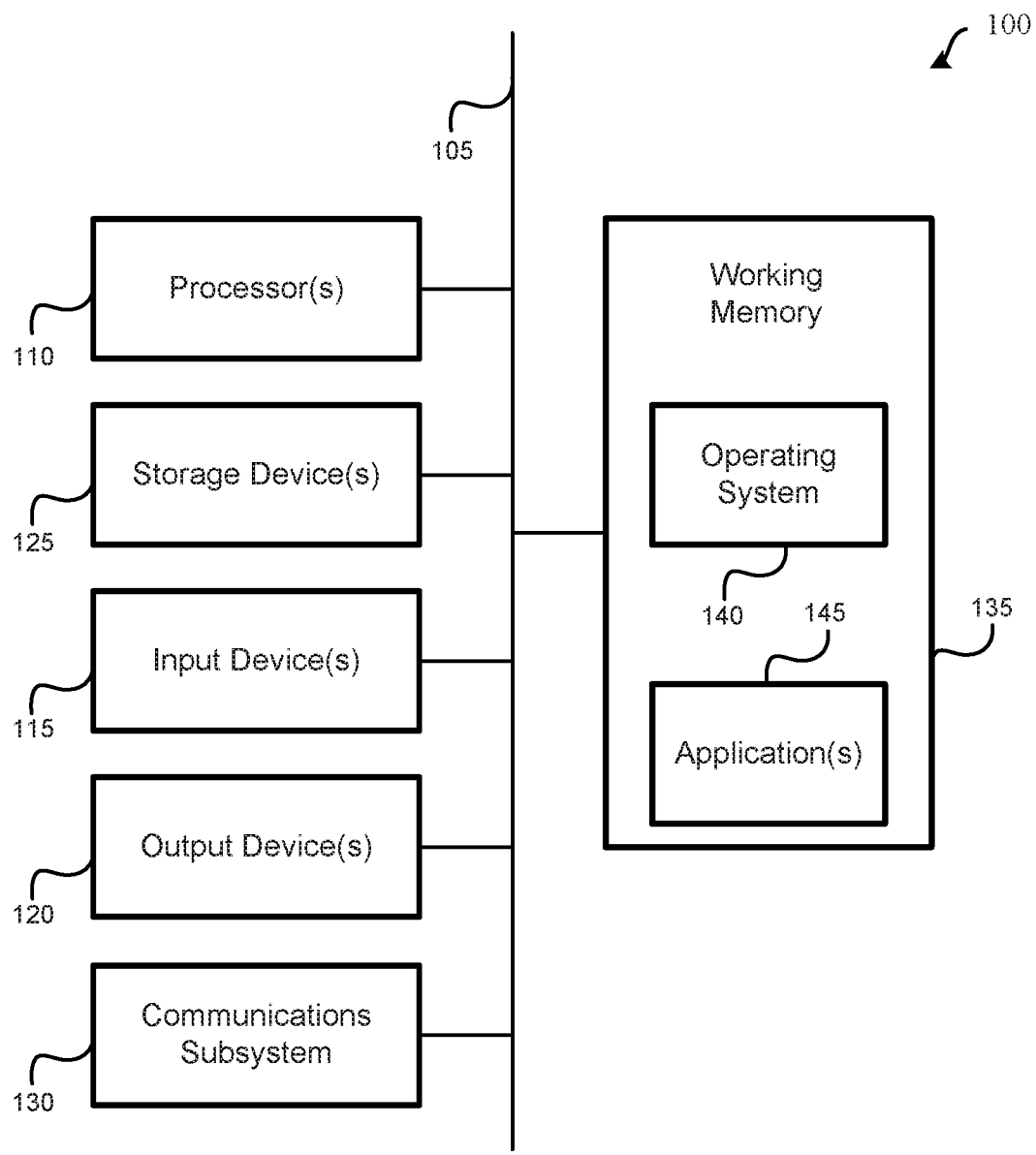
FIG. 1 illustrates an embodiment of a computer system.

FIG. 1 illustrates an embodiment of a computer system 100. A computer system 100 as illustrated in FIG. 1 may be incorporated into devices such as a secure private information management device, DVR, television, media system, personal computer, and the like. Moreover, some or all of the components of the computer system 100 may also be incorporated into a portable electronic device, mobile phone, or other device as described herein. FIG. 1 provides a schematic illustration of one embodiment of a computer system 100 that can perform some or all of the steps of the methods provided by various embodiments. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105, or may otherwise be in communication, as appropriate. The hardware elements may include one or more processors 110, including without limitation one or more general-purpose processors and/or one or more special-purpose processors such as digital signal processing chips, graphics acceleration processors, and/or the like; one or more input devices 115, which can include without limitation a mouse, a keyboard, a camera, a microphone, and/or the like; and one or more output devices 120, which can include without limitation a display device, a printer, and/or the like.

The computer system 100 may further include and/or be in communication with one or more non-transitory storage devices 125, which can comprise, without limitation, local and/or network accessible storage (e.g., a remote device or cloud storage), and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 100 might also include a communications subsystem 130, which can include without limitation a modem, a network card (wireless or wired), an infrared communication device, a wireless communication device, and/or a chipset such as a Bluetooth® device, an 802.11 device, a WiFi device, a WiMax® device, cellular communication facilities, etc., and/or the like. The communications subsystem 130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 130. In other embodiments, a portable electronic device, e.g. the first electronic device, may be incorporated into the computer system 100, e.g., an electronic device or STB, as an input device 115. In many embodiments, the computer system 100 will further comprise a working memory 135, which can include a RAM or ROM device, as described above.

The computer system 100 also can include software elements, shown as being currently located within the working memory 135, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the methods discussed below, such as those described in relation to FIGS. 3-8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 125 described above. In some cases, the storage medium might be incorporated within a computer system, such as computer system 100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 100 and/or might take the form of source and/or installable code, which, upon compilation and/or installation on the computer system 100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 100 to perform methods in accordance with various embodiments of the technology. According to a set of embodiments, some or all of the procedures of such methods are performed by the computer system 100 in response to processor 110 executing one or more sequences of one or more instructions, which might be incorporated into the operating system 140 and/or other code, such as an application program 145, contained in the working memory 135. Such instructions may be read into the working memory 135 from another computer-readable medium, such as one or more of the storage device(s) 125. Merely by way of example, execution of the sequences of instructions contained in the working memory 135 might cause the processor(s) 110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to processor(s) 110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 125. Volatile media include, without limitation, dynamic memory, such as the working memory 135.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100.

The communications subsystem 130 and/or components thereof generally will receive signals, and the bus 105 then might carry the signals and/or the data, instructions, etc. carried by the signals to the working memory 135, from which the processor(s) 110 retrieves and executes the instructions. The instructions received by the working memory 135 may optionally be stored on a non-transitory storage device 125 either before or after execution by the processor(s) 110.

Figure 2A:
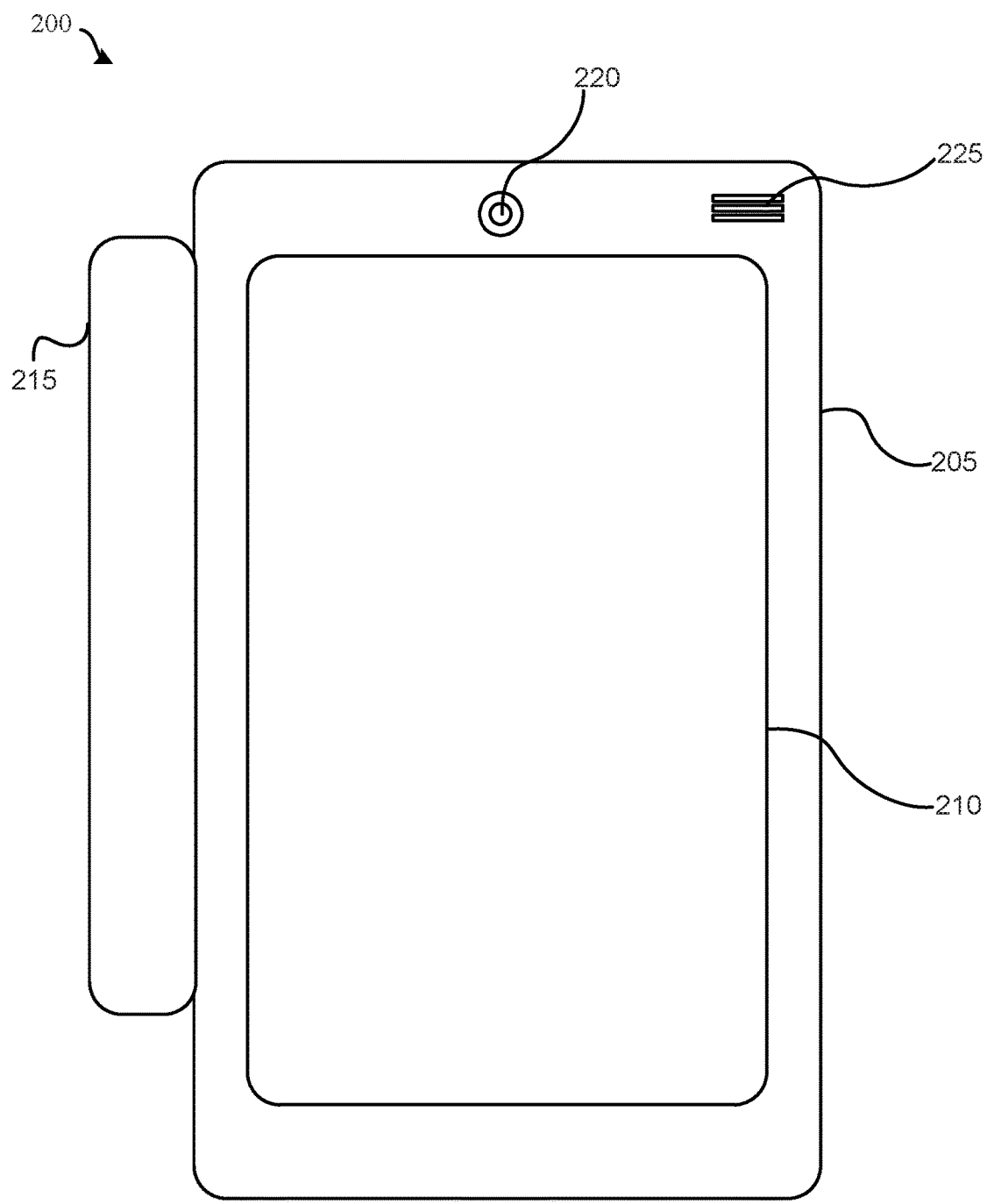
FIG. 2A illustrates an embodiment of a secure private information management device.

FIG. 2A illustrates an embodiment of a secure private information management ("PIM") device 200. The PIM device 200 can include an exterior housing 205, a screen 210, a card reader 215, a camera 220, and a microphone 225. The PIM device 200 can be of such dimensions and weight that it is portable so it can be carried around the owner's home to input data for storage as described further below. In some embodiments, the PIM device 200 can be a portable base unit and utilize a docking station for storage and/or charging.

The PIM device 200 can be a computer that, though not shown in FIG. 2A, can also include processors (e.g., processor 110), storage device (e.g., storage device 125), memory (e.g., memory 135), and other components as described above with respect to FIG. 1 and the remaining components described below with respect to FIGS. 2A-2C. While not depicted in FIG. 2A, the one or more processors, memory, and storage device contained within PIM device 200 can be used to obtain information and store the information securely, as described in more detail below.

The PIM device 200 can include an exterior housing 205 that can be made of any suitable material including, but not limited to, plastic, rubber, or metal. In some embodiments, the exterior housing 205 is ruggedized for use in environments hostile to electronic devices. In some embodiments, the exterior housing 205 is fireproof. In some embodiments, the exterior housing 205 is tamper resistant. In some embodiments, if the exterior housing 205 is tampered with, the PIM device 200 can automatically disable itself. For example, the PIM device 200 can erase all data on the PIM device 200 storage device. As another example, the PIM device 200 can lock down and refuse all access to the data stored on the storage device until the owner or an administrator provides an override password or the manufacturer provides a passcode or hardware key to re-enable the PIM device 200. In some embodiments, when the PIM device 200 identifies tampering, the PIM device 200 can activate a camera 220 to record the tampering.

The screen 210 can be made of any suitable material including, but not limited to, plastic or glass. In some embodiments, screen 210 can be a touch screen. Screen 210 can be used to display a user interface for interacting with the PIM device 200. In some embodiments, a keyboard can be displayed on screen 210 for entry of information and data into the PIM device 200. In some embodiments, screen 210 can be used to scan documents for entry of the data into PIM device 200. For example, the processors in the PIM device 200 can contain instructions for providing a user interface to display on screen 210. One of the features of the user interface, in some embodiments, can be to allow the user to place a document on the screen 210 and the PIM device 200 can scan the document. As another example, the user interface can provide a keyboard for entering information. The PIM device 200 processors can obtain the information from the keyboard provided on the screen 210 by the user interface or scan of the document and store the information in the PIM device 200 storage device (e.g., storage device 125).

In some embodiments, the card reader 215 can be attached to the PIM device 200 via one side of the exterior housing 205, as shown in FIG. 2A. The card reader 215 can be a reader that is coupled to the PIM device 200 such that swiping a card in the card reader 215 enters the card data into the PIM device 200. The card reader 215 can read a card by reading the magnetic strip located on many typical cards (e.g., credit card, driver license, debit card, gift card, and so forth). Other types of card technology, for example, smart chips that are embedded into the card, can also be read by card reader 215. In some embodiments, card reader 215 can be a slot in the PIM device 200 into which a user can insert a card, and PIM device 200 can read the card with an internal scanner. The card reader 215 can be coupled to the PIM device 200 processors that process the card information when a card is scanned. The PIM device 200 processors can obtain the card information and store the information in the PIM device 200 storage device (e.g., storage device 125).

In some embodiments, PIM device 200 can include a camera 220. Camera 220 can be a high resolution camera for taking pictures of information for entry into the PIM device 200. The camera 220 can be operated through the screen 210 by, for example, a user interface accessible through screen 210, which can be a touchscreen or operated with peripherals such as a keyboard and/or mouse. The camera 220 can be coupled to the PIM device 200 processors that can obtain the information from a picture taken by camera 220 and store the information in the PIM device 200 storage device (e.g., storage device 125).

In some embodiments, PIM device 200 can include a microphone 225. Microphone 225 can allow a user to speak information for entry into PIM device 200. For example, a user can speak a telephone number into the microphone 225 for storage in PIM device 200. The microphone 225 can be coupled to the PIM device 200 processors (e.g., processor 110), allowing the processors to obtain information through microphone 225 and store the information in PIM device 200 storage device (e.g., storage device 125).

FIG. 2B illustrates an alternate view of PIM device 200. As shown in FIG. 2B, card reader 215 includes a card slot 230 for swiping a card, allowing card reader 215 to read the card. Once the card is read by card reader 215, the PIM device 200 processors can process the information and enter it into the storage device in the PIM device 200.

FIG. 2C illustrates another alternate view of PIM device 200. PIM device 200 can include multiple peripheral interfaces, as shown, for example, in FIG. 2C. For example, PIM device 200 can include one or more Universal Serial Bus ("USB") ports 235, one or more High Definition Multimedia Interface ("HDMI") ports 240, one or more Video Graphics Array ("VGA") ports 245, network interface 250, and speaker jack 255. Multiple other interface ports are not shown but could also be included in PIM device 200. PIM device 200 can also include a socket for a power cord 265 and a power switch 260.

PIM device 200 can include USB ports 235 for connecting peripherals to PIM device 200 including, for example, a scanner, a printer, a portable memory stick, a camera, a smartphone or other smart wireless device, and so forth. The peripherals can be used for entering information into PIM device 200 or for retrieving information from PIM device 200. For example, a scanner can be used for scanning documents, and the processors of PIM device 200 can then obtain the information and enter it into the storage device in PIM device 200. Similarly, for example, a portable memory stick can include data which, when the memory stick is plugged into the USB port 235 of PIM device 200, can be obtained by the processors of PIM device 200 and entered into the PIM device 200 storage device. In some embodiments, a user interface can be utilized to access information from the storage device in the PIM device 200 and store a copy of the information on a portable memory stick plugged into USB port 235. In some embodiments the PIM device 200 can store a copy of the information on other devices (e.g., a smartphone or other smart wireless device or on cloud storage) using a wireless protocol (e.g., Bluetooth®, Wifi, or Zigbee®).

PIM device 200 can include HDMI port 240 for attaching, for example, a monitor or other display device to PIM device 200. Similarly PIM device 200 can include VGA port 245 for attaching a monitor or other display device to PIM device 200. The display devices can be used in addition to or instead of screen 210 in some embodiments.

PIM device 200 can include network port 250 for connecting the PIM device 200 to a network including, for example, a home network or workgroup. In addition to the capability to connect to a wired network, the PIM device 200 can include network adaptors, transmitters, and receivers for connecting to wireless networks that communicate via various protocols including, for example, 802.11b, Bluetooth®, Zigbee®, WiMax®, and so forth.

PIM device 200 can include speaker jack 255 for connecting a speaker to PIM device 200. In some embodiments, speakers can be connected for hearing audible data stored in the storage device of PIM device 200.

PIM device 200 can include a power socket 265 for receiving an AC power cord to plug into a wall outlet for powering PIM device 200. In some embodiments, PIM device 200 can also include a power switch 260 for turning the PIM device 200 on and off. In some embodiments, PIM device 200 can include a power backup unit (e.g., a battery backup) that allows the PIM device 200 to remain powered on in the event of a power failure. In some embodiments, PIM device 200 can be completely battery powered. Battery power can be supplied by non-rechargeable or rechargeable batteries. In some embodiments, the PIM device 200 can use a docking station for providing power to the PIM device as well as other peripheral ports for displays, printers, and so forth. In some embodiments, the PIM device 200 can connect either with a wired connection or wirelessly to a hub. The hub can have accessories or peripherals attached so that the PIM device 200 can utilize the accessories.

The PIM device 200 can also include a proximity sensor. The proximity sensor can be used for determining whether a remote electronic device is in physical proximity with the PIM device 200 as described further with respect to pairing a remote electronic device with the PIM device. A proximity sensor can also be included to maintain security of the data stored on the PIM device 200. If the PIM device 200 is removed from the owner's home as determined by the proximity sensor, the PIM device 200 can notify the owner via, for example, an email or text message. In some embodiments, the PIM device 200 can automatically disable itself upon removal from the owner's home. The automatic disabling mechanism can, for example, delete all data stored on the storage device of the PIM device 200. In some embodiments, the automatic disabling mechanism can disable all access without, for example, a biometric authentication and a hardware key authentication. In some embodiments, the PIM device 200 can implement a global positioning system ("GPS"). If the PIM device 200 is removed from the owner's home, the GPS location can be provided to, for example, the owner's remote device for the owner to locate the PIM device 200.

The PIM device 200 can also include the capability of knowing where a user is based on GPS location or any other location tracking means. For example, if a user accesses the PIM device 200 using a smartphone, the smartphone GPS locating mechanism can provide the GPS location to the PIM device. In some embodiments, the PIM device 200 can request the location of the user from the smartphone or other device with location tracking abilities. In such embodiments, the PIM device 200 can request the location information on a timed basis, for example every 5 minutes. In some embodiments the user's smartphone or other device used to access the PIM device 200 can, for example, periodically provide the location of the user. In some embodiments, the user's location can be sent to the PIM device when the PIM user interface is activated on the user's mobile device.

In some embodiments, the PIM device 200 can utilize the user's location information (e.g., from the GPS location provided by the user's smartphone) to provide notifications to the user via text, email, a notification through the user interface, or any other suitable notification method. For example, when a user is within a certain proximity of a store (e.g., 15 feet if walking or 0.25 miles if driving), the PIM device 20 can notify the user if the user has stored a gift card for that store in the PIM device 200. The notification can include, for example, that the user has a gift card and the balance of the gift card. The balance of the gift card can be checked by the PIM (e.g., using the gift card website and gift card information) to provide accurate balance information. Data that changes can be updated by the PIM device, including credit card balances, other debt balances, any bank account balances, and so forth. As another example, the PIM device 200 can notify the user of a discount coupon available for the store if the store is within a certain proximity. The PIM device 200 can acquire the discount coupon by obtaining it from storage or by accessing it online by, for example, searching the Internet. As another example, the PIM device 200 can notify the user that a store has been compromised (e.g., the store database has been hacked recently). The PIM device 200 can acquire warning information by alerts from news sources (the PIM device 200 can be configured to receive news alerts through the PIM user interface) or by searching the Internet, for example.

In some embodiments, the PIM device 200 can recognize when the user is shopping online using a device with which the user connects to the PIM device 200. If the user is shopping at an online merchant for which the user has a gift card, the PIM device 200 can remind the user of the gift card and/or allow the user to elect to pay with the gift card stored on the PIM device 200.

Figure 3:
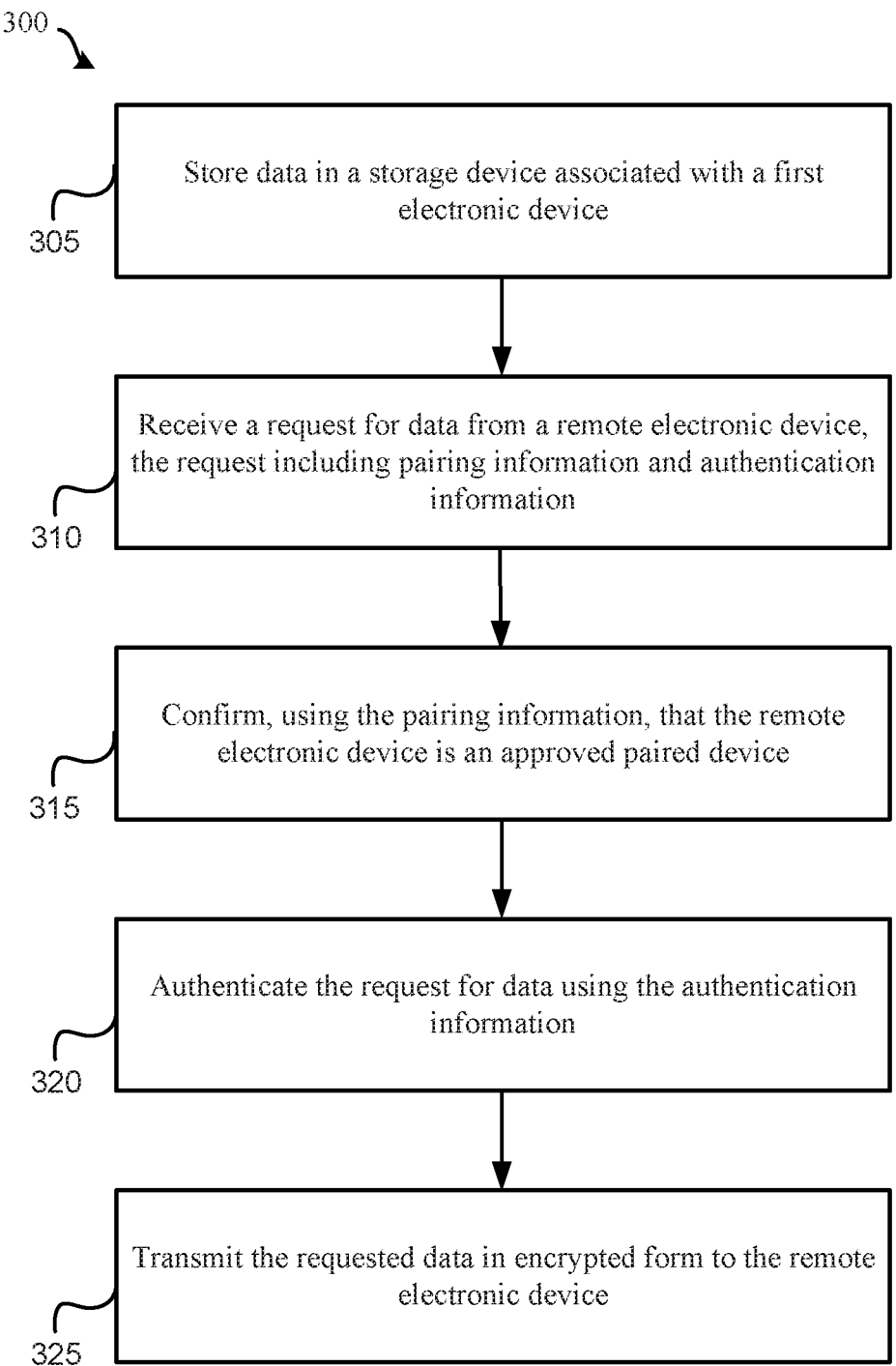
FIG. 3 illustrates a method for using a secure private information management device.

FIG. 3 illustrates a method 300 for using a secure PIM device, such as, for example, the PIM device 200 described above with respect to FIGS. 2A-2C.

At 305, data is stored in a storage device associated with a first electronic device. The first electronic device can be, for example, a secure PIM device, such as PIM device 200. The storage device can be, for example, storage device 125 as shown in FIG. 1. As discussed above with respect to FIGS. 2A-2C, the data can be obtained through any of a multitude of peripherals and input devices such as, for example, a card reader, a scanner, a microphone, a network interface, and so forth. In some embodiments, the data is encrypted prior to storing it in the storage device.

The data to be stored in the PIM device can include any personal information for the user or the user's family members, or any other data that the user may want accessible but very securely stored. For example, tax documents, a marriage certificate, a divorce decree, health insurance information, life insurance information, auto insurance information, VIN numbers, house deeds, vehicle titles, credit cards, debit cards, driver licenses, passports, reward cards, usernames and passwords, personal identification numbers ("PINS"), social security cards and numbers, and so forth.

At 310, the PIM device (e.g., the PIM device 200), can receive a request for data from a remote electronic device. The request for data can come through, for example, an app downloaded on a remote device or a website that allows access to the PIM device. The remote electronic device can be, for example, a portable electronic device such as a laptop, a smartphone, a tablet, any LTE connected device, or any other suitable electronic device capable of sending such a request. The request for data can include pairing information and authentication information. The pairing information can include a unique code associated with the remote electronic device that the PIM device can use to identify the remote electronic device as an approved paired device. In some embodiments, the pairing information can be encrypted. The authentication information can be used by the PIM device to authenticate the user of the remote electronic device. Authentication will be discussed in further detail below as well. Providing both authentication information and pairing information can allow the PIM device to approve or deny the request for data based on both whether the user is an authenticated/approved user and/or whether the device is a paired/approved device. In some embodiments, only pairing information is used. In other embodiments, only authentication information is used. In some embodiments, both pairing and authentication information is used.

At 315, the PIM device can use the pairing information to confirm that the remote electronic device is an approved paired device. In some embodiments, the pairing information can include a unique code associated with the remote electronic device that the PIM device can use to identify the remote electronic device as an approved paired device. Remote devices can be paired with the PIM device prior to requesting data which can allow the PIM device to recognize the remote electronic device as a trusted device. When pairing occurs, the remote electronic device can provide information to the PIM device to prove that it is a trusted device. For example, the pairing can occur using a QR code. In some embodiments, the remote electronic device can be paired while in physical proximity to the PIM device and, in some embodiments, with authentication information for the user on the remote electronic device and/or on the PIM device. The physical proximity of the device can provide some proof that the user is an acceptable user with an acceptable device. In some embodiments, the user can carry a hardware key, for example, a USB stick or a Bluetooth® smart card for authentication. The USB stick can contain information that provides pairing information to the PIM device which allows the pairing to succeed as from an authorized device. In some embodiments, the pairing can be initiated from the PIM device utilizing the PIM user interface.

At 320, the PIM device can authenticate the request for data using the authentication information. The authentication information can include, for example, a username and password and/or biometric data such as a retinal scan, fingerprint, voice recognition, or facial recognition. The username and password can be used to confirm that the user requesting the data is a user that has access to the PIM device. In some embodiments, multiple users can access the PIM device. In such embodiments, the multiple users can each have different username and password combinations. Further, in some embodiments, the user may have access to some, but not all of the data in the storage device associated with the PIM device. The authentication information can be used to determine whether the user requesting the data has access to the data being requested. If the user is authenticated and the user has access to the requested data, the data request can be authenticated.

In some embodiments, the PIM device can implement multiple levels of security. For example, level one security can include a username and password for authentication. Level one security may or may not include an encryption key as level one security can be used for access control only. For level one security, the user can have account credentials (e.g., username and password) reset if they are forgotten. The user may have to provide some information (e.g., user information created at setup) including word and picture security information (e.g., a picture of the user's favorite food can be selected from an array of pictures). In some embodiments, the PIM device can implement level two security. Level two security may utilize a username and password and an encryption key derived from the username and password. The user can be given hints that were developed at initial setup (e.g., word and picture hints intended to help the user recall his or her password) if the user forgets the user's username and/or password. In some embodiments, level three security can be implemented using 2-factor authentication. The 2-factor authentication can include a username and password plus a hardware encryption key. The user can be given hints that were developed at initial setup if the user forgets the user's username and/or password. The hardware key can also be used to validate the user. Additionally, if the hardware key is lost, multiple copies can exist for replacement, or a user may need to contact the PIM device manufacturer to authorize another copy of the key to be made and sent to the user. In some embodiments, the PIM device can implement level four security which can also use 2-factor authentication. The 2-factor authentication can include a username and password plus a smartcard generated encryption key. Multiple copies of the smartcard can be made in case the smartcard is lost. The user can be given hints that were developed at initial setup if the user forgets the user's username and/or password. In all security levels, biometric data rather than or in addition to a username and password can be used. Biometric data can include, for example, a retinal scan, a fingerprint scan, voice recognition, or facial recognition.

To ensure further security, in some embodiments the PIM device can implement expiring passwords for users. For example, a user can request a password upon leaving home, and the password can expire in, for example, 12 hours. Each time the user believes the user may need information from the PIM device (e.g., the user is going car shopping), the user can request a password for use with the PIM device. Such a password may also be paired with a particular user device when the user knows that the password will be needed from a particular device, such as the user's mobile phone. The user may utilize an application on the mobile device to enter the password, which may be sent along with identifying information of the mobile device to the PIM device for verification before the PIM device allows access to its contents. The PIM device can then verify both the password and the device sending the password to provide additional security before access to the PIM device contents are provided. In some embodiments, the PIM device can ensure security by only receiving transmissions. Once a user and/or remote device is properly authenticated, the PIM device can, for example, send transmissions to that device for a limited amount of time. After the time has expired, the user and/or remote device would need to be authenticated again by the PIM device to allow the PIM device to send transmissions to that remote device.

In some embodiments, the remote device can require a passcode or password to access the website or app providing the user interface for access to the PIM device. In some embodiments, the PIM device can authenticate the user at the PIM device in addition to the passcode or password required by the remote device for access to the user interface.

In some embodiments, the user can lock down the PIM device by entering a lockdown code either with a remote device on the user interface to the PIM device or directly on the PIM device using the user interface on the screen of the PIM device. If the PIM device receives the lockdown code, the PIM device can deny all access until, for example, an unlock code is entered. The PIM device can require, for example, that the unlock code be entered on the screen of the PIM device or that it be entered on a remote device in physical proximity with the PIM device. In some embodiments, the manufacturer can provide the unlock code either upon delivery of the PIM device or on request by the owner or administrator.

In addition, the PIM device can utilize access levels that depend, for example, upon from where the remote device is accessing the PIM device. For example, if the access type is local (i.e., on the PIM device screen), authentication may not be necessary. In some embodiments, authentication for local access can be according to the above described levels depending on the amount of security desired by the user. In some embodiments, the remote device can access the PIM device through the Internet, and the security levels can be implemented depending on the amount of security desired by the user. In some embodiments, the remote device can access the PIM device via the Internet where the data is stored in the cloud, which is described in more detail below. In such embodiments, levels three and four security may not be able to be implemented because a hardware key and smartcard cannot be implemented in a cloud based system in some cases.

In some embodiments, the PIM device can implement GPS tracking or a disabling option if the PIM device is removed from the owner's home as determined by a proximity sensor, as described above with respect to FIGS. 2A-2C.

In some embodiments, when the PIM device is accessed by a remote electronic device, the PIM device can send a notification via, for example, email or text, to an administrator (e.g., the primary data owner) which can be set up utilizing a user interface during initial setup of the PIM device. The notification can alert the administrator that the PIM device has been accessed. The notification can provide a link, for example, allowing the administrator to cancel access by the remote electronic device if the access is unexpected or the administrator may think is potentially a security breach. The administrator can also, for example, enter the lockdown code disabling all access to the PIM device as described in more detail above.

In some embodiments, the PIM device can include multiple processors such that, for example, a secondary processor can monitor the primary processor to detect hackers or other intrusions that may result in a breach of the user's private information. In some embodiments, a detected hacking attempt can be responded to with fake information. In some embodiments, a hacker can be intentionally allowed access to the PIM device in order to trap the hacker. For example, an intentional hole can be created to trap the hacker and obtain the necessary information to identify the hacker.

At 325, the PIM device can transmit the requested data in encrypted form to the remote electronic device. In some embodiments, the data can be stored in the storage device in encrypted form. In such embodiments it may not be necessary to encrypt the data prior to transmittal. In other embodiments, the data can be stored in the storage device in unencrypted form and can then be encrypted prior to transmittal. In some embodiments, the PIM device can allow the remote device to access information from another location. For example, the PIM device can allow the remote device to access information stored on the cloud or server farm, such as that depicted at 915 in FIG. 9.

Figure 4:
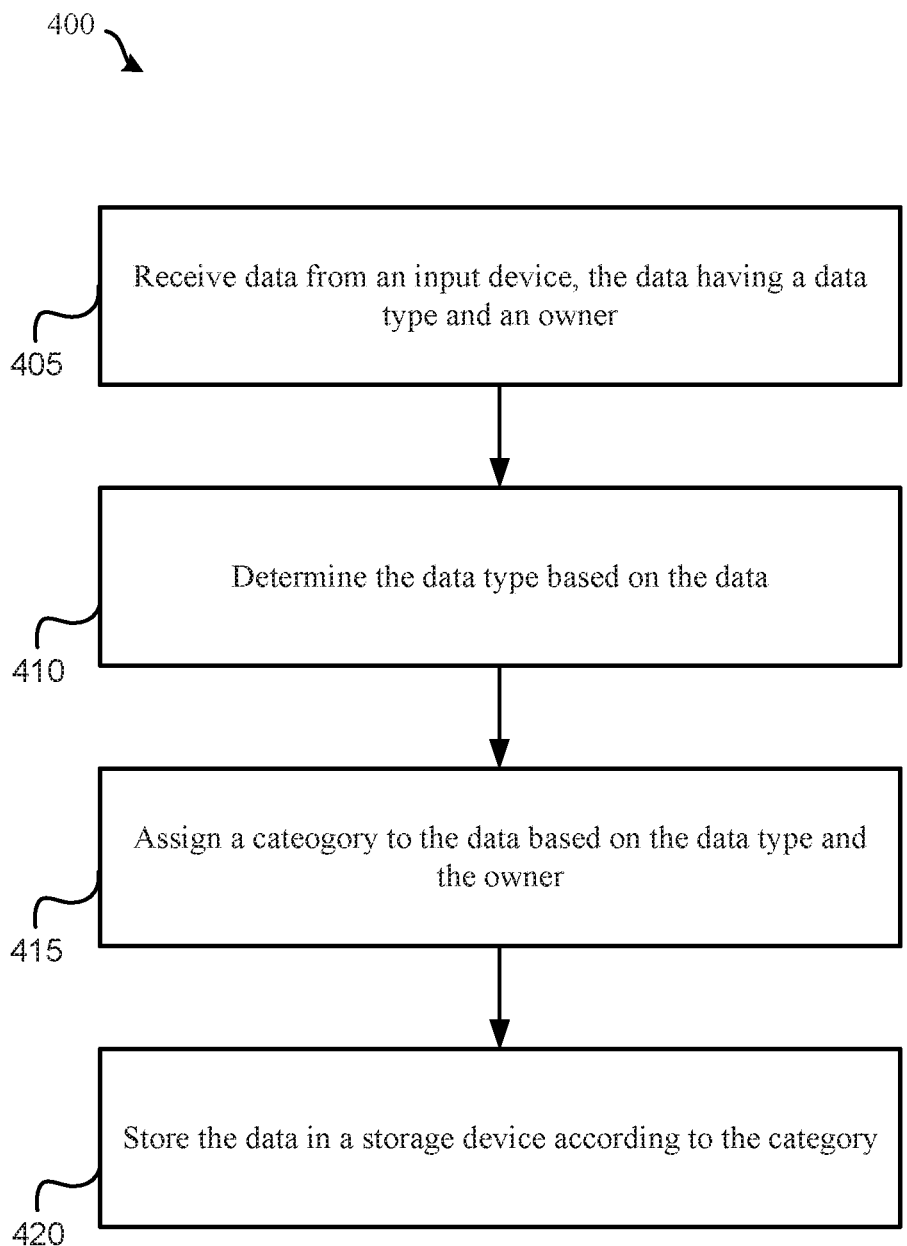
FIG. 4 illustrates another method for using a secure private information management device.

FIG. 4 illustrates a method 400 for storing data in a storage device, such as storage device 125 illustrated in FIG. 1, according to an embodiment. The method 400 describes, for example, more detail associated with the data storage at 305 of FIG. 3.

At 405, the PIM device (e.g., PIM device 200) can receive data from an input device. The input device can be, for example, a microphone (e.g., microphone 225), a scanner, a card reader (e.g., card reader 215), a memory stick, another computer over a network, a smartphone or other smart device, or any other suitable input device. The data can be any form of data including audio (e.g., from a microphone), video (e.g., a video from a networked computer), text (e.g., from a keyboard), a file (e.g., from a scanner), an image (e.g., from a camera), and so forth. In some embodiments, the user can enter information into a remote device (e.g., the user's smartphone with which the user accesses the PIM device), and the data can be stored temporarily on the remote device until the remote device accesses the PIM device. Upon access, the remote device can provide the PIM device with the temporarily stored data. In some embodiments, the data can be encrypted prior to transmitting to the PIM device. In some embodiments, the data can be stored in a cache on the PIM device temporarily if, for example, the entry of the data is done by someone without a login or without proper access to store the data permanently. Upon login by an authorized user, the authorized user can commit the data to permanent storage to keep the data, or the authorized user can delete the information from the cache without permanently storing the data if it is unwanted.

At 410, the PIM device can determine the data type based on the data. When the PIM device receives a new piece of data, it can analyze the data to determine the data type. For example, if the user scans in a copy of a social security card, the PIM device can identify from the data on the card that the card is a social security card. It can then identify the data type, for example, as social security number data. The PIM device can further identify the owner of the data based on the name on the card. In some embodiments, an initial setup can be done to identify owners of data that is entered. As another example, the user can enter the social security number by speaking the number into a microphone (e.g., microphone 225). The PIM device can use voice recognition to identify the spoken digits and identify the number as a social security number. In some embodiments, the user can say the owner name and type of the data rather than allowing the PIM device to interpret the information. For example, the user can say, "Ted's social security number is 555-11-2222." The PIM device can then parse the data to identify the owner as "Ted," the data type as "social security number," and the data value as "555-11-2222." In other embodiments, the PIM device can identify the owner using a voiceprint of the user to match the owner with the voice of the speaker, identify the data type as a social security number based on the 9-digit number, and identify the data as the 9-digit number. In some embodiments, the user can use a user interface to confirm or set the proper data type and owner of the entered data and fix any errors with the entry of the data, the data type assignment, or the owner assignment.

There are many other examples for identifying the data type and owner based on the data. In some embodiments, the PIM device can also store the data in the storage device in multiple forms. For example, if the user scans a copy of a social security card, the PIM device can identify the owner and the social security number data type based on the image and the data on the card. The PIM device can store the file as scanned in as well as an audio copy of the social security number and owner and a text copy of the social security number and owner.

As another example, the user can input a credit card number. The PIM device can interpret the number and, based on patterns and number sequences or other algorithms and definitions, can determine that the number is a credit card number (e.g., because credit card numbers are 16 digits) and can further identify the type of credit card (e.g., Visa, Discover, MasterCard, etc.) based on the first 4 digits of the number.

In some embodiments, the PIM device may not be able to determine the data type based on the data and its existing algorithms and definitions. The PIM device can scour the Internet for information about the patterns, numbers or words contained in the data. The PIM device can check sites, such as, for example, Spokeo, Life Lock, Facebook, Twitter, Linked In, and other public or private sites to identify sequences that can be correlated. If the PIM device identifies a match, it can store the data as a data type under the information it found. In some embodiments, the user can confirm that the PIM device has properly identified the data type using the user interface.

In some embodiments, the PIM device can identify the owner of the data based on the authentication information of the user entering the data. For example, if "Sue" is authenticated on the PIM device and scans in a document, the PIM device can assign "Sue" as the owner. In some embodiments, contrary information identifying the owner can be provided. For example, if Sue scans in Ted's credit card, the PIM device can recognize Ted as the owner of the credit card, but Sue as the owner of the information because she is entering it. In some embodiments, the PIM device can have a setting resolving conflicts, such as, for example, a setting in the user interface that can be set during setup. For example, the user interface can provide an option for handling conflicts allowing the user to automatically set the authenticated user entering the data to be the owner if a conflict arises. In some embodiments, the PIM device can alert the item owner (e.g., alert Ted that Sue has entered Ted's credit card) that another user has entered data and is the data owner of an item owned by that item owner.

At 415, the PIM device can assign a category to the data based on the data type and the owner. For example, for a credit card entered for a user, "Ted," the category can be "Ted's credit cards." Other embodiments can use other categorization techniques and naming conventions. The categorization can be to make the data easy to identify to the user.

At 420, the PIM device can store the data in the storage device according to the category. The storage device can, in some embodiments, store the data in a database. The data can be stored, in those cases, with fields including the data type, the owner, the category, and the data in multiple formats (e.g., text, audio, image, etc.). In some embodiments, to ensure security, the data can be encrypted prior to storage in the storage device. In some embodiments, pieces of the data can be extracted and stored. For example, it may not be necessary to store an entire image of a marriage license. Instead, the PIM device can, in some embodiments, extract the names of the married individuals along with the license number and the date of the license, for example.

Figure 5:
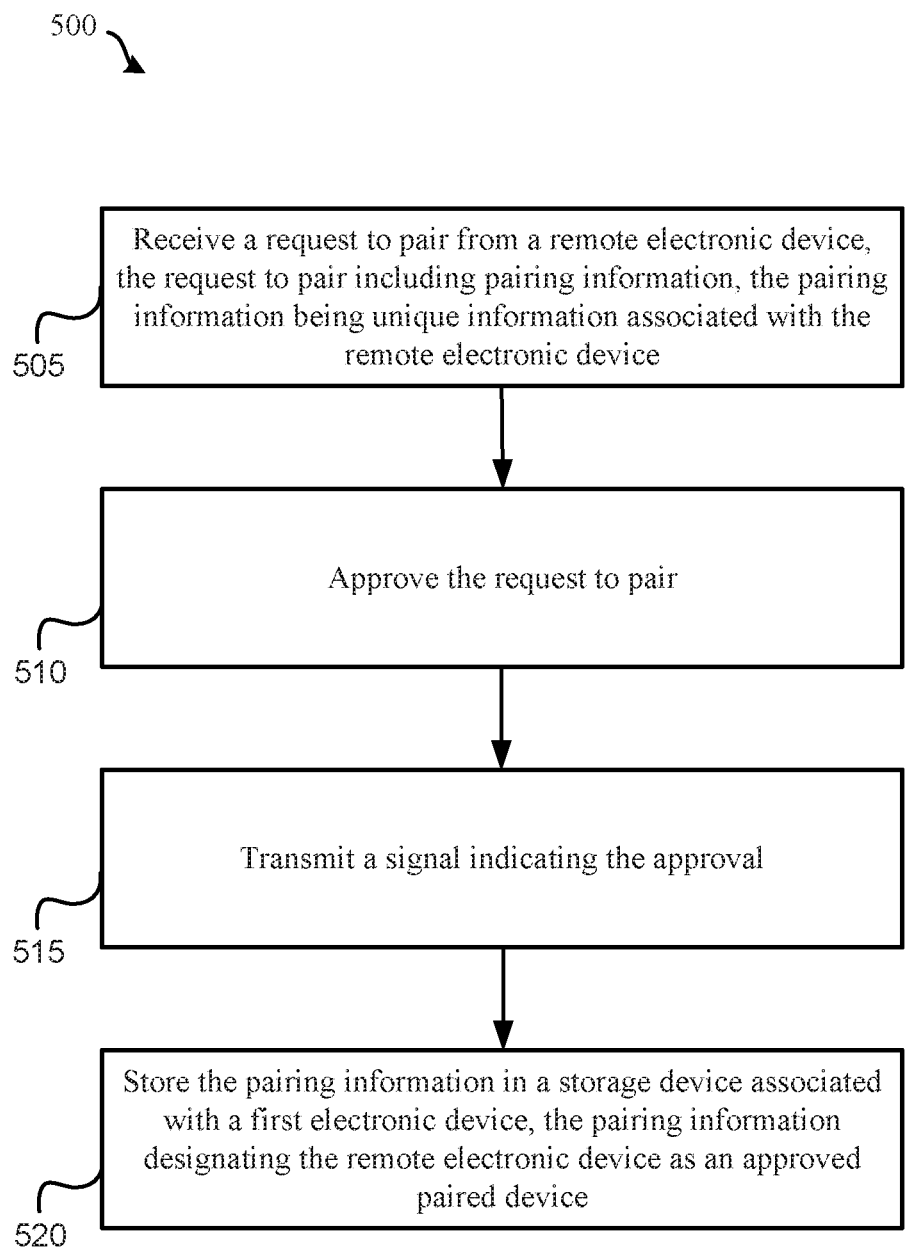
FIG. 5 illustrates yet another method for using a secure private information management device.

FIG. 5 illustrates a method 500 for pairing a remote electronic device (e.g., a smartphone or tablet) to the PIM device (e.g., PIM device 200). In some embodiments, pairing devices can be required prior to receiving data from the storage device at the paired device.

At 505, the PIM device can receive a request to pair from a remote electronic device. The request to pair can include pairing information. The pairing information can be unique information associated with the remote electronic device. The unique information associated with the remote electronic device can be, for example, a random code of sufficient length to essentially ensure that the code will be unique. In other embodiments, the media access control address ("MAC address") of the remote electronic device can be the unique information associated with the remote electronic device. Any other suitable value that is unique can be used as well.

In some embodiments, the request to pair can be approved only if the remote electronic device is in physical proximity with the PIM device. For example, the request to pair can be transmitted via Bluetooth®, which requires that the devices be in physical proximity because the Bluetooth® signal is limited in distance. Another example is to use Wifi protected setup ("WPS") to pair the remote electronic device with the PIM device. In some embodiments, the remote electronic device can be physically connected to the PIM device through, for example, a USB port, allowing the remote electronic device to pair with the PIM device. As another example, a pairing code can be displayed on the PIM device screen for entering on the remote device to initiate a valid pair request. As another example, a QR code can be on the PIM device or displayed on the screen of the PIM device. The remote electronic device can scan the QR code, which initiates a request to pair. Because the remote electronic device must be within sight range to scan the QR code on the PIM device, the physical proximity of the device is proven. As another example, the request to pair can be approved in some embodiments if the remote electronic device is connected to a home network to which the PIM device is also connected. In some embodiments, the pairing can be initiated through the user interface of the PIM device to pair with a remote electronic device. In some embodiments, upon pairing, the remote electronic device is provided with an application used for authentication of the remote device as a paired device.

At 510, the PIM device can approve the request to pair. In some embodiments, the pairing information and requests are sufficient to allow the PIM device to approve the remote electronic device to pair. In some embodiments, the authentication of a user on the remote electronic device can be used in addition to or instead of the physical proximity requirement or other requirements described above. The authentication of a user can include, for example, a username and password associated with a user that has access. In some embodiments, the authentication can use biometric data. For example, the user can be authenticated with a retinal scan, a fingerprint scan, using voice recognition, or using facial recognition. Once the PIM device determines that the required criteria are met with respect to the remote electronic device and/or the user authentication, the PIM device can approve the remote electronic device as an approved paired device.

At 515, the PIM device can transmit a signal indicating the approval. The PIM device can send an approval that can include, for example, a cookie that can be stored on the remote electronic device that contains the pairing information for use on future requests for data. In some embodiments, the signal indicating the approval can display a message on the remote electronic device indicating to the user that the device successfully paired.

At 520, the PIM device can store the pairing information in the storage device. The pairing information can include the unique information associated with the remote electronic device. The pairing information stored in the storage device can indicate that the remote electronic device is an approved paired device.

Figure 6:
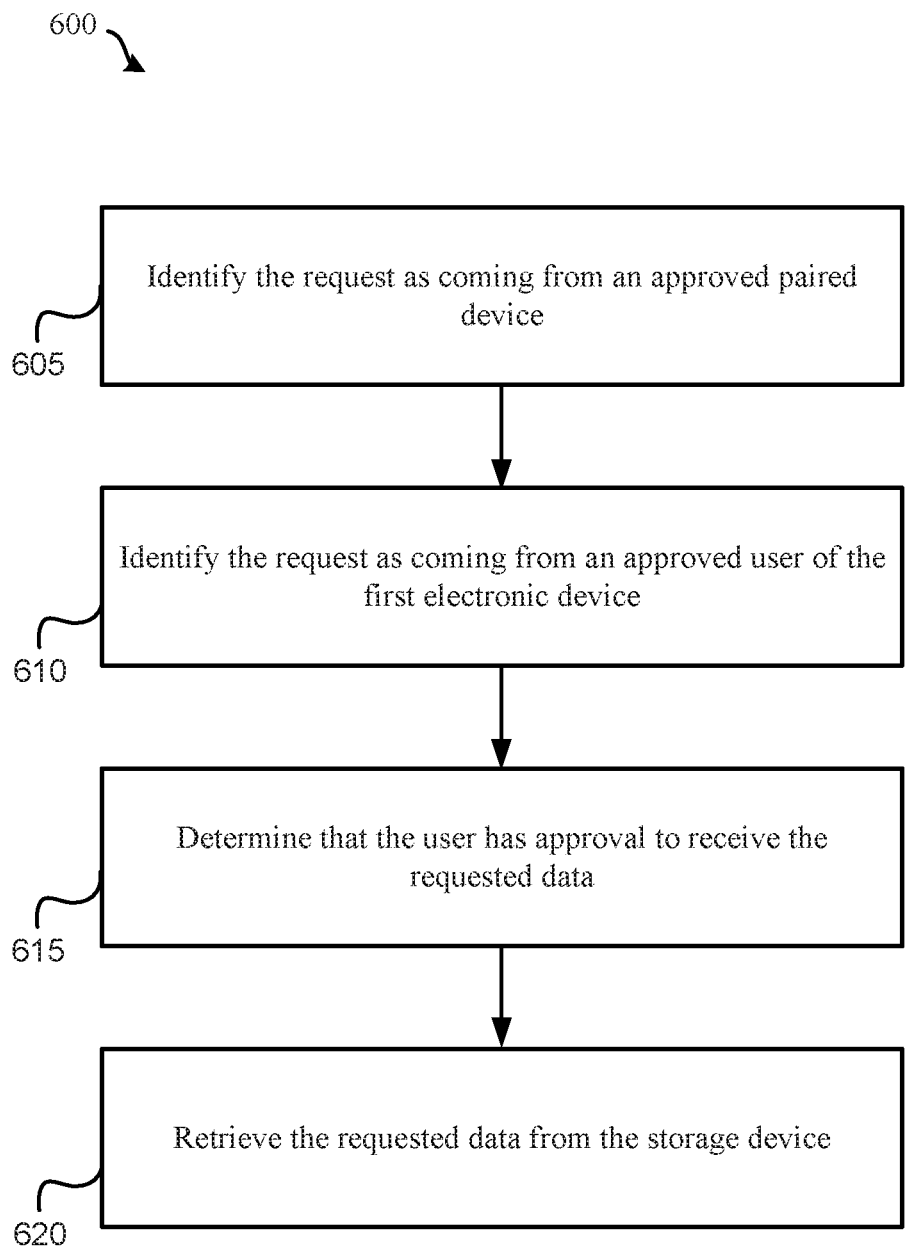
FIG. 6 illustrates yet another method for using a secure private information management device.

FIG. 6 illustrates a method 600 for authenticating a data request and providing the requested data. The method 600 describes, for example, more detail associated with the authentication 320 of FIG. 3.

At 605, the PIM device can identify the request as coming from an approved paired device. A remote electronic device can be paired with the PIM device for example as described above with respect to FIG. 5. The PIM device can recognize the remote electronic device as having been approved or as an approved paired device using the pairing information included with the data request. For example, the pairing information can include a unique code associated with the remote electronic device which can be confirmed by checking the storage device for a paired device having the unique code provided in the data request.

At 610, the PIM device can identify the request as coming from an approved user. The data request can include authentication information, for example, a username and password and/or biometric data. The PIM device can utilize the authentication information to authenticate the user sending the data request. In some embodiments, an initial setup of the PIM device can be completed that allows the user to create a username and password, a Bluetooth® smart card, a USB key, and/or biometric data for each user that will be using the PIM device. The authentication information can be stored in the storage device. When the PIM device receives the data request including the authentication information, it can verify that the user is a user of the PIM device before allowing access to the data stored in the storage device.

At 615, the PIM device can determine that the user has approval to receive the requested data. In addition to confirming that the user is a confirmed user of the PIM device, the PIM device can confirm that the user has access to the requested data. In some embodiments, the data request will be from the owner of the data. The PIM device can determine that the owner of the data has access to the data and can allow the user that is the owner of the data to receive the requested data. In some embodiments, the user requesting the data can be someone other than the owner of the data. For example, a child may have access to a parent's credit cards, debit cards, or gift cards. As another example, both spouses may have access to all the information in the PIM device while only part of the information is owned by each spouse. As another example, a named executor in a last will and testament or a family member needing access to a living will or healthcare directive can have access to limited documents or all documents but limited to the event of need. In such cases, the PIM device can determine that the user that is not the owner can have access to the requested data in a number of ways. For example, when the data is initially stored in the storage device, the user inputting the data can give access to other users of the PIM device. In some cases, the PIM device can send a message (e.g., a text message) to the owner of the data at the time of the request, the message can request permission for the non-owner user to access the data. If the owner provides permission, the PIM device can allow the non-owner user access to the data. In some embodiments, the manufacturer of the PIM device can provide an override password or hardware key that can be used to access the PIM device if the owner is unable.

At 620, the PIM device can retrieve the requested data from the storage device. The data request can include a request for, for example, a specific piece of data (e.g., Ted's proof of auto insurance) or a category of data (e.g., Ted's credit cards). Additionally, the request for data can include a return type. For example, if the user is requesting the data on a device that does not support images and only supports audio, the PIM device can provide an audio only version of Ted's proof of auto insurance information. As described above, the PIM system can store the data in multiple formats so that when the user requests the data in audio or visual format, the PIM device can provide the data in the requested format. In some embodiments, the PIM device can notify the PIM device administrator or owner that data has been accessed. The notification can be an email, a text message, a notification through the PIM user interface, or any other suitable notification method.

Figure 7:
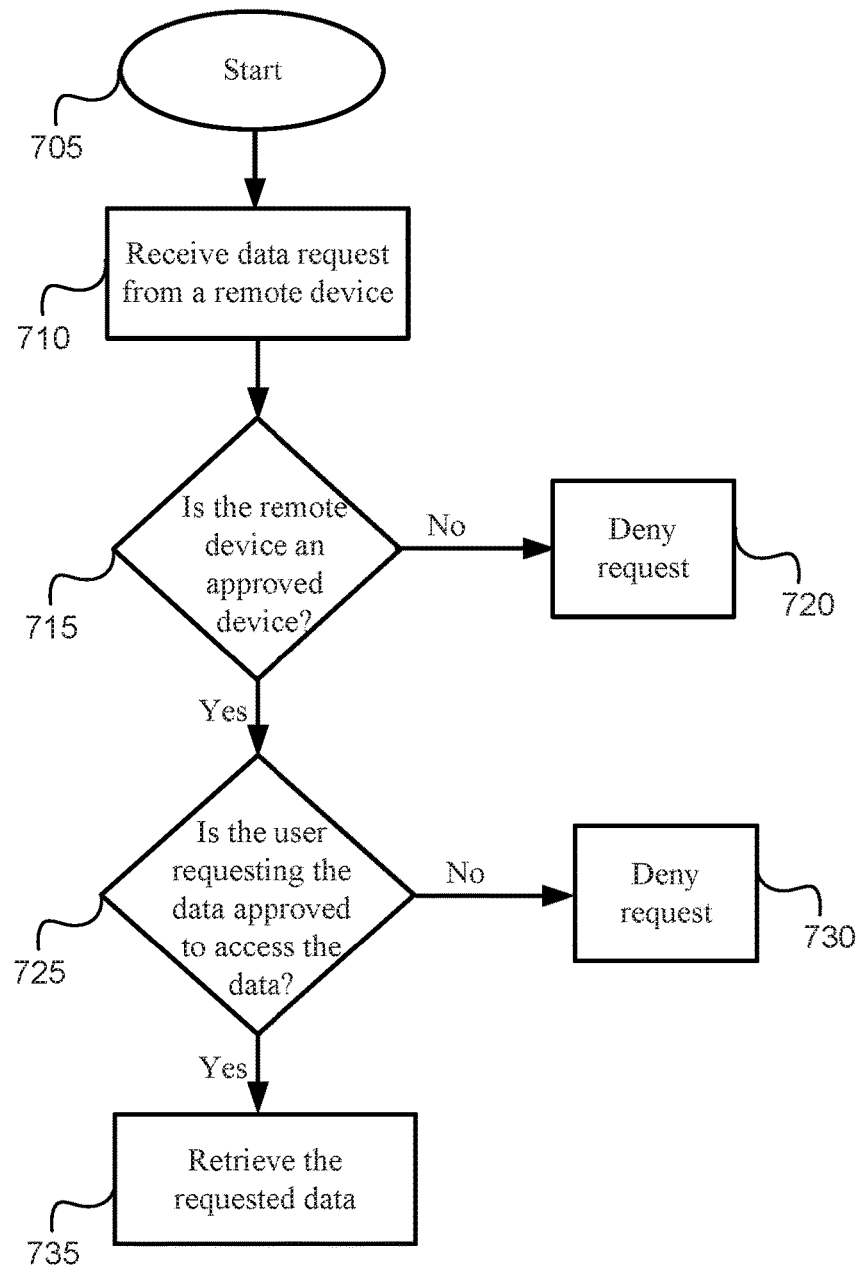
FIG. 7 illustrates a flow chart describing a portion of the logic for use in an embodiment of a secure private information management device.

FIG. 7 illustrates a flow chart describing a portion of the logic for use in an embodiment of a secure PIM device. The logic can be used in conjunction with, for example, method 600.

At 710, the PIM device can receive a data request from a remote device. The data request can include a description of the requested data, authentication information for the user requesting the data, pairing information for the remote device from which the request originated, and/or a data format for the response. In some embodiments some, all, or information in addition to the above information can be included in the data request.

At 715, the PIM device can determine if the remote device is an approved device. In some embodiments, the remote device can be an approved device based on whether it is a paired device as described above with respect to FIG. 5. In some embodiments, an approved device can be based on whether the remote device has the proper capability for receiving the information (e.g., the remote device is communicatively compatible with the PIM device). In some embodiments, the remote device can be an approved device if it is associated with an approved user. In some embodiments, remote devices that are not portable can be considered not approved. If the device is not an approved device (e.g., is not paired), the process ends at 720 with a denial of the data request. Upon denial, a denial message can be transmitted to the remote electronic device notifying the user that the request failed. In some embodiments, the owner or an administrator can receive a notification of a failed data request. If the remote device is an approved device, the flow continues to 725.

At 725, the PIM device can determine if the user requesting the data is approved to access the data. The PIM device can determine whether the user is an authorized user of the PIM device using, for example, a username and password. In addition, in some embodiments, the PIM device can determine whether the requesting user (e.g., based on the username and password) has access to the requested data. The requesting user can be, for example, the data owner and can typically have access to the data. In other cases, the requesting user can be a user other than the data owner. The requesting user can have access to the data by, for example, the data owner having given permission to the requesting user to access the requested data. Permission can be granted at the time of entry of the data into the storage device in some embodiments. Permission can be granted at another time, for example, upon data request the PIM device can request permission from the data owner for the requesting user to access the data via, for example, a text message. In some embodiments, when a user is added to the system the user's access permissions can be granted at that time. In some embodiments, all users of the PIM device can have access to all information stored by the PIM device. In yet other embodiments, some users can have access to all data stored by the PIM device while other users have lesser authorization and have access to less than all of the data stored by the PIM device. In some embodiments, temporary access can be granted to data if, for example, a data owner wants to allow a second user to access certain data for a specified period of time. For example, Dad may grant Son access to a credit card for one week while Son is away on a trip. Dad can further limit Son's access by placing a limit on the dollar amount Son can use on the credit card.

If the user is not an authorized user of the PIM device (e.g., the username and password do not match an authorized user of the PIM device) or if the user is not authorized to have access to the requested data, the PIM device can deny the data request at 730. If the PIM device denies the request, a message can be transmitted alerting the user to the denial. In some embodiments, the owner and/or an administrator can also be notified of the denial. If the user is an authorized user of the PIM device and the user is authorized to access the requested data, the PIM device can approve the data request and proceed to 735.

A notification can be sent to the owner and/or an administrator of the PIM device if a data request is approved or denied via, for example, text message or email. If the request is denied, the notification can include the reason for denial and information about the requestor. If the request is approved, the notification can include information about the request and the requestor.

At 735, the PIM device can retrieve the requested data from the storage device as described in more detail with respect to 630 in FIG. 6.

Figure 8:
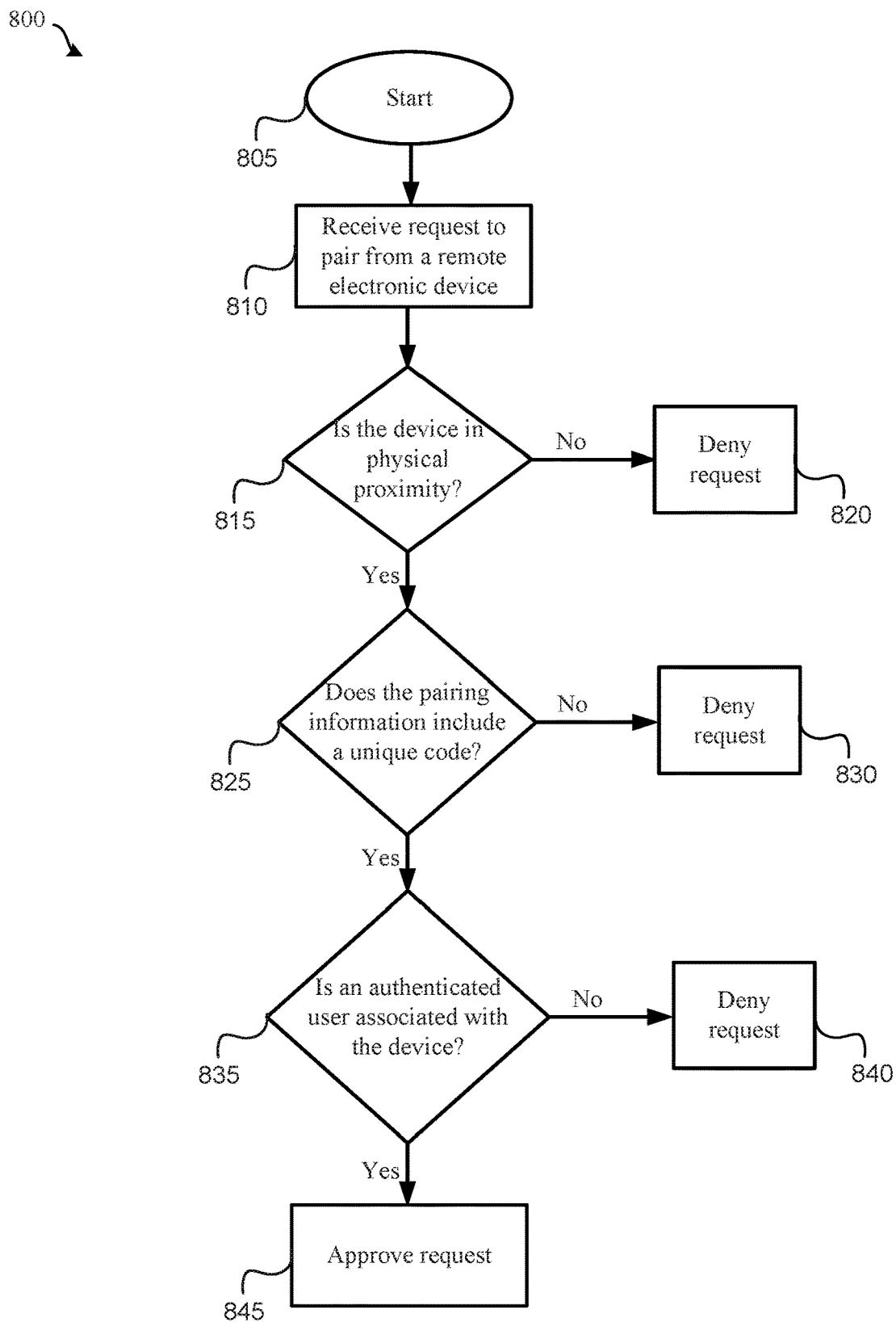
FIG. 8 illustrates another flow describing a portion of the logic for use in an embodiment of a secure private information management device.

FIG. 8 illustrates a flow chart describing a portion of the logic for use in an embodiment of a secure PIM device. The logic can be used in conjunction with, for example, method 500.

At 810, the PIM device can receive a request to pair from a remote electronic device. The request to pair can be handled as described with respect to 510 in FIG. 5.

At 815, the PIM device can determine whether the remote electronic device is physically proximate to the PIM device. The determination can be based on, for example, the protocol used for the communication. For example, if the request to pair is issued via Bluetooth®, the remote electronic device must be relatively physically proximate because Bluetooth® has a limited range. Other communication protocols with similar range limitations would also ensure close physical proximity (e.g., NFC or Zigbee®). Another example is that the request can be issued from a remote electronic device connected to a home network to which the PIM device is also connected. While this may not require a specific physical proximity, it can require that the remote electronic device is trusted by the home network, providing a level of proximity that can, in some embodiments, provide the necessary level of trust to approve the remote device for pairing. Additionally, as described above with respect to 510 of FIG. 5, a QR code can also be used to initiate the pairing request, which, if the QR code is displayed on the screen of the PIM device, also provides assurance that the remote device is in physical proximity with the PIM device. If the PIM device does not confirm the appropriate physical proximity, the pair request can be denied at 820. In some embodiments, a notification can be sent to the remote device if the request is denied. In some embodiments, a notification of the denial can also be sent to the owner and/or an administrator. If the remote device is determined to be physically proximate, the flow continues at 825.

At 825, the PIM device can determine whether the pairing information includes a unique code. In some embodiments, the pairing information can include as the unique code, for example, the MAC address of the remote device as described above with respect to 505 of FIG. 5. In some embodiments the PIM device can generate a code using a pseudorandom number ("PRN") generator and use that code as the unique code. The unique code can be any unique code that can be associated with the remote device. The PIM device can determine whether the pairing information includes a unique code. If not, the request can be denied at 630. In some embodiments, a notification can be sent to the user in the event of a denial. In some embodiments, a notification can be sent to the owner and/or an administrator in the event of a denial. In some embodiments, the PIM device can issue a unique code to the remote device instead of denying the pairing request. If the pairing information includes a unique code, or if the PIM device issues a unique code to the remote device, the flow can continue at 835.

At 835, the PIM device can determine whether the user is an authenticated user associated with the PIM device. For example, the authentication information can include a username and password, which can be verified by the PIM device as being associated with a user with access to the PIM device. If the user information cannot be authenticated, the request can be denied at 840. If the user information can be authenticated, the request can be approved at 845. Upon denial at 840, a message notifying the user of the denial can be sent to the remote electronic device. The denial notification can include, for example, the reason for the denial. Additionally, a notification can be sent to the owner and/or an administrator providing a notification of the failed pair request.

A notification can be sent to the owner and/or an administrator of the PIM device if a pair request is approved or denied via, for example, text message or email. If the request is denied, the notification can include the reason for denial and information about the requestor. If the request is approved, the notification can include information about the request and the requestor.

As discussed above, the PIM device can include a user interface for storing and accessing data. The user interface may be accessible on the screen of the PIM device. The user interface can include options for setting up users. Setting up user information can include assigning a password to the user or allowing the user to select a password. The setup can also include associating security questions and answers to the user to restore the user information or allow a password reset if the user forgets his password. The security questions and answers can, for example, allow the user to use images to select his favorite food or sport. The setup can also allow the user to set biometric data for the user including retinal scans, fingerprints, voice recognition, and facial recognition. Additionally, security levels can be set for the user at setup.

The user interface can also be used to input data into the PIM device. As discussed above, various input devices and peripherals can be used to enter data into the PIM device. Upon entry of the data into the PIM device, the data can be categorized automatically, as described above. The user interface can display the categorization information for the inputting user and can, in some embodiments, allow the user to edit the categorization. In some embodiments, the user interface can allow the user to associate data with multiple categories. In some embodiments, the user interface can allow the user to select multiple formats for storing the data (e.g., audio format, image format, and so forth).

The user interface can also be used to allow the user to view and/or access the data stored in the PIM device. In some embodiments, the user interface can require authentication to use or view the user interface and/or the data in the PIM storage device. For example, the above described security levels can be used to require, for example, a username and password or biometric authentication. The user interface can be used to browse the available categories for the data that is accessible by the user. Selection of a category can allow the user to see the data stored under the category. The user interface can include a search option to allow the user to search for specific data or for a category of information. The user interface can also include an option to browse all available data for the user. In some embodiments, the user interface can include icons or other pictures for easy use by the user. For example, certain icons can be designated for different types of documents, which can be grouped together for easy access (e.g., a number symbol for storing phone numbers, a car icon for vehicle related data, etc.).

Each remote device can additionally include a downloaded application that provides a user interface on the remote device for accessing the PIM device. In some embodiments, the PIM device can be accessible via a webpage user interface. The user interface for the PIM device can provide remote access based on the authentication and pairing confirmation described in detail above. In some embodiments, the remote user interface can include a search option to search for a specific data item or a category search that can provide the user data included in an entire category. In some embodiments, the remote user interface can provide multiple data items sorted by category, which the user can browse through. The categories can be organized in the user interface, for example, by tabs assigned to each category. In some embodiments, if some data is accessible by a user but the search entered is broad, only the data the user has access to is returned. A notification can be displayed to the user explaining that data is not included that the user does not have permission to access.

In some embodiments, the search functionality can search the Internet or other sources if the requested data is not already stored on the PIM device. For example, the user can request a VIN for the user's vehicle. If the PIM device does not already have that information, the PIM device can search for the VIN. The PIM device can be configured to search through the user's automobile policy if the PIM contains that document. In some embodiments, the PIM device can be configured to log into the user's automobile policy to get the VIN (e.g., the user has Allstate as its vehicle insurance carrier, so the PIM device can use the login information it has stored for Allstate to log in to Allstate and obtain the VIN). In some embodiments, the PIM device can search the Internet generally for the information including Google, Spokeo, Life Lock, Facebook, Twitter, Linked In, and other public or private sites. In some embodiments, the PIM device can be partnered with or otherwise have access to a security company, such as for example Life Lock, which can also provide a source for obtaining information that was not specifically entered into the PIM device by the user.

In some embodiments, the storage device can be backed up to create multiple copies of the data stored on the storage device. The PIM device can implement multiple levels of backup. For example, level one backup can include syncing the storage device to a personal computer, smartphone or other smart device, or other local hard drive. The backup can be to a device on a home network to which the PIM device is connected. The data can be encrypted on backup or it can be stored without encryption on the backup drive. Level one backup can be used for in-home only access by not making the backup drive available to the Internet. In some embodiments, level two backup can be implemented. Level two backup can be using a USB mass storage device to sync the PIM device data to. The USB device can be attached to the PIM device. The data can be encrypted on the backup USB device, and access can follow the above described security levels. The USB device can be accessible similarly to the PIM device, in some embodiments. In some embodiments, the PIM device can implement level three backup in which the PIM storage device is synced to a cloud device. The cloud device can inherit the PIM security level for the data, and the PIM device can authenticate itself on the cloud device. The data on the cloud device can follow the PIM device encryption. In some embodiments, the cloud device backup can be accessible by the PIM device but no other devices. In some embodiments, cloud device sharing can also be implemented. In some embodiments, the user can select whether to back up the PIM device and which level of backup to utilize.

Figure 9:
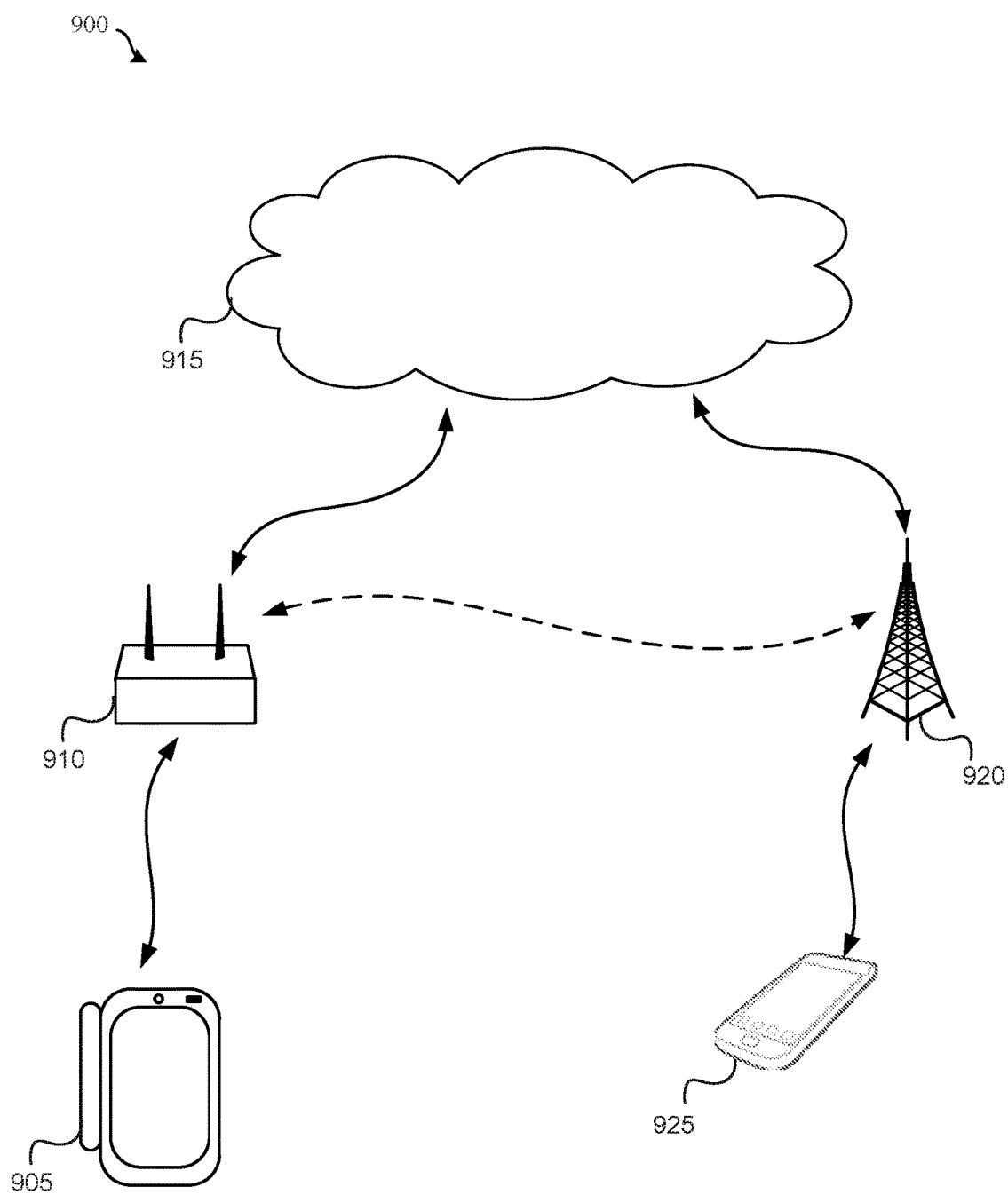
FIG. 9 illustrates an embodiment of a simplified ecosystem including a secure private information management device.

FIG. 9 illustrates an embodiment of a simplified ecosystem 900 including a secure PIM device. The ecosystem 900 can include a PIM device 905, a local router 910, a server farm 915, a remote router 920, and a remote electronic device 925.

The PIM device 905 can be a PIM device as described above with respect to PIM device 200 in FIGS. 2A-2C. The PIM device 905 can be communicatively coupled to local router 910.

The local router 910 can be, for example, a home network router that couples a home network with the Internet. The local router 910 can communicate with both the PIM device 905 and the Internet, allowing communication with the server farm 915.

The server farm 915 can be cloud storage, a server farm operated by a content delivery network ("CDN"), a server farm operated by an internet service provider ("ISP"), a server farm operated by a third party affiliate (e.g., a data security company such as Life Lock), a server or servers owned by the PIM device owner, or any other suitable storage location accessible over the Internet. In some embodiments, the server farm 915 can be not used and the local router 910 can communicate directly with the remote router 920. In some embodiments, the server farm 915 can be used as backup only.

The remote router 920 can be a router at, for example, any public location such as a restaurant, a hotel, an airport, and so forth. The remote router 920 can also be any router suitable for the communication protocol being used, such as, for example, a cellular tower (e.g., an LTE router) or a Wifi router.

The remote electronic device 925 can be any suitable remote electronic device as described above. The remote electronic device 925 can be a laptop, tablet, smartphone, or any other suitable electronic device capable of communication with remote router 920.

In use, as described in detail above, information can be stored in the PIM device 905, the cloud, or a remote device for access by the users. The system can be used in three different ways. The first is without the server farm 915 being implemented, the second is with the server farm 915 implemented as backup only, and the third is with the server farm 915 implemented as an accessible location of the information.

If the server farm is not implemented, the PIM device 905 stores the information in a local storage device within the PIM device 905. A data request can issue from remote electronic device 925, which is routed through the remote router 920 and local router 910 to the PIM device 905. The PIM device can authenticate the request as described in detail above according to the implemented security level. The PIM device 905 can then transmit the requested data to the remote electronic device 925, which is routed through the local router 910 and the remote router 920.

If the server farm 915 is implemented as a backup device, the PIM device 905 can transmit stored data through local router 910 to the server farm 915 during backup. When the remote electronic device 925 issues a data request, the server farm 915 can be bypassed and the request can be handled as described above where the server farm 915 is not implemented.

If the server farm 915 is implemented as an accessible location, the server farm 915 can handle a data request just like the PIM device 905. The remote electronic device 925 can request data from the PIM device 905, and the request can be communicated from the remote electronic device 925 to the remote router 920. The remote router 920 can route the request to the server farm 915 to respond to the request. The server farm 915 can have security levels configured as described above and can handle the request by authenticating the requesting user and the remote device 925. Once the server farm 915 authenticates the data request, it can transmit the requested data through the remote router 920 to the remote electronic device 925.

In some embodiments, the data requested from the remote electronic device 925 can be routed through the server farm 915 to increase security. For example, the server farm 915 can modify the encrypt/decrypt keys, making hacking more difficult.

The following use cases show the use of various embodiments.

Use Case 1: A user can be applying for credit at, for example, a bank or a car dealership. The credit applications can require the user to validate the user's identify by answering a series of questions from the user's credit report. Because the user does not have the user's credit history memorized, the user may not be able to answer the questions. Using a remote electronic device that has been paired with a PIM device, the user can access the user's credit history to answer the questions. In such a case, the user can use, for example, the user's smartphone to access a copy of the user's credit history on the smartphone from the PIM device. As described above, for example, the user can access an app or a website using his smartphone that provides a user interface to the PIM device. The user can enter the necessary authentication information (e.g., biometric data or a username and password). The user interface can then allow the user to request data from the PIM device. In some embodiments, the user can be authenticated prior to having access to the user interface. In some embodiments, the user can be authenticated again on the PIM device once the data request is transmitted to the PIM device. In other embodiments, the user can access the user interface and authentication occurs only after a request for data is submitted through the user interface to the PIM device. Returning to the example, the user can request, for example, the category "credit report" to access copies of credit reports the user has permission to access on the PIM device. The PIM device can authenticate the request and the PIM device or the server farm/cloud can return the appropriate credit report data or allow the data to be accessed by the remote electronic device/smartphone. In some embodiments, the PIM device can transmit all credit reports requested. In other embodiments, the PIM device can provide links for selecting the credit report that the user would like to view. The user can select a credit report having the needed information and subsequently answer the necessary questions to complete the credit application.

Use Case 2: A user can be requesting insurance quotes but not have the vehicle identification number ("VIN") needed to get an accurate quote. Similarly, the user may not know the current insurance limits for comparison purposes. Using a remote electronic device, the user can access the user's automobile insurance policy or the VIN of the vehicle for which to request the quote. The user can, for example, use a tablet to access the PIM user interface. The user can provide authentication information, which the PIM can use to authenticate the user and/or tablet. The user can request the VIN from the PIM device, and the PIM device can return the VIN in audio or textual format, for example. The user can provide the VIN to the quoting company and receive an accurate insurance quote.

Use Case 3: A user can lose the user's wallet, passport, or other key item on vacation or a business trip. The user can be in a situation in which the user has no way to return home from the trip because identification is required to board a plane and passports are required to enter and leave countries. Using a laptop, the user can access the PIM user interface. The user can provide authentication information, allowing access to the PIM data. The user can request, via the user interface, the user's driver license and/or passport from the PIM device. The PIM device can authenticate the data request and transmit an image of the user's driver license and passport to the laptop, which the user can then print out. If, for example, the user is an American in a foreign country, the user can provide the printout to the United States consulate, which will help the user get the necessary information for return to the United States.

Use Case 4: A user is admitted to an emergency room and the user's family member accompanying the user does not have the necessary insurance information to provide to the emergency room for payment. The user's family member can access a web version of the PIM user interface using his smartphone and request access. The request can include the specific data requested by the user's family member (e.g., the user's insurance card). The PIM device can transmit a text message to an administrator notifying the administrator of the user's family member requesting access and to which data. The administrator can respond to the text message transmitted from the PIM device, the response allowing access by the user's family member to the PIM device for the specific data (the user's insurance card). The PIM device can, upon approval from the administrator, transmit the user's insurance card to the user's family member's smartphone. The PIM device can then terminate the session since the only information the user's family member has access to has already been transmitted.

Use Case 5: A user arrives at a restaurant for dinner having forgotten a gift card that the user has for the restaurant. The user can access the gift card using his or her smartphone from the PIM device for paying for the services at the restaurant. In some embodiments, the PIM device can provide the gift card information to the user in a bar code format or QR code format for easier use with the Point Of Sale device.

Use Case 6: A user arrives at a merchant having forgotten a rewards card that can be used at the merchant's store (e.g., AMC stubs, Conoco Kickbacks, etc.). The user can access a copy of the rewards card on the user's smartphone from the PIM device. The merchant can scan the rewards card providing rewards to the user or a barcode that is provided by the PIM device for scanning to apply the rewards to the reward card.

Use Case 7: A user arrives at a store and has forgotten his credit card. The user can access, on the user's smartphone, the app that provides the user interface to the PIM device. The user can provide the necessary biometric data and/or username and password to access the PIM device. The user can request an authentication code from the PIM device to allow the point of service ("POS") terminal to interface with the PIM device. The user can provide the authentication code to the merchant. Once the authentication code is entered into the POS terminal, the terminal can interface with the PIM device to confirm the identity of the user and allow the POS terminal to charge the user's purchase to the user's credit card stored on the PIM device.

Use Case 8: Similar to Use Case 7, the user is a child of the parent user, who would like to pay with a parent's credit card. The PIM device can be configured to allow the child to utilize a certain amount of the credit on the parent's credit card. When the child user provides an authentication code to the POS terminal, the POS terminal can interface with the PIM device to confirm the identity of the child user and allow the POS terminal to charge the child user's purchase to the parent user's credit card up to the limit established by the parent user.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for secure communication, comprising:
    receiving, at a first time, by a first electronic device from a remote electronic device, a request to pair the remote electronic device with the first electronic device;
    approving, at the first time by the first electronic device, the request to pair in response to determining that the remote electronic device is in physical proximity to the first electronic device at the first time;
    storing, by the first electronic device in accordance with the approving, a designation that the remote electronic device is an approved paired device;
    receiving, at a second time subsequent to the first time, by the first electronic device from a requestor via the remote electronic device, a request for access to a first data item of a plurality of data items, each data item securely stored in a storage device associated with the first electronic device, such that each data item is associated in the storage device with one or more owners authorized to access the data item from the storage device;
    determining, by the first electronic device in response to receiving the request for access, that the remote electronic device is at a location physically remote from the first electronic device;
    obtaining, by the first electronic device, in accordance with the request to access and responsive to determining that the remote electronic device is at a location physically remote from the first electronic device, pairing information associated with the remote electronic device and authentication information associated with the requestor;
    confirming the remote electronic device, by the first electronic device, by using the pairing information to obtain, from the storage device, the designation that the remote electronic device is an approved paired device;
    authenticating the requestor, by the first electronic device, by using the authentication information to determine the requestor is stored in the storage device in association with the first data item as one of the one or more owners authorized to access the first data item; and
    transmitting, from the first electronic device, the first data item in encrypted form to the remote electronic device responsive to the confirming and the authenticating.

2. The method of claim 1, further comprising:
    transmitting, from the first electronic device in response to the approving, a signal indicating the approval.

3. The method of claim 1, wherein determining that the remote electronic device is at a location physically proximate to the first electronic device at the first time comprises determining that the request to pair is received by the first electronic device without passing through any remote router.

4. The method of claim 1, wherein a communication protocol is used over a home network to receive the request to pair.

5. The method of claim 4, wherein the communication protocol is near field communication ("NFC").

6. The method of claim 1, further comprising:
    providing a quick response code ("QR code") associated with the first electronic device that, when scanned by the remote electronic device, causes the remote electronic device to initiate the request to pair.

7. The method of claim 1, wherein the authentication information includes biometric information.

8. The method of claim 1, wherein at least one of the plurality of data items is securely stored in the storage device by:

scanning a document with a document scanner using the first electronic device; and storing, by the first electronic device, data obtained by the scan of the document in the storage device associated with the first electronic device as the at least one of the plurality of data items.

9. The method of claim 1, wherein at least one of the plurality of data items is securely stored in the storage device by:

scanning a card with a card reader using the first electronic device, the card having a magnetic strip readable by the card reader; and storing, by the first electronic device, data obtained by the scan of the card in the storage device associated with the first electronic device as the at least one of the plurality of data items.

10. The method of claim 1, wherein at least one of the plurality of data items is securely stored in the storage device by:

receiving, at the first electronic device, an audio signal from a microphone associated with the first electronic device; and storing, by the first electronic device, data obtained from the audio signal in the storage device associated with the first electronic device as the at least one of the plurality of data items.

11. The method of claim 1, wherein at least one of the plurality of data items is securely stored in the storage device by:

receiving over a network, at the first electronic device, data from a second electronic device; and storing, by the first electronic device, the data received from the second electronic device in the storage device associated with the first electronic device as the at least one of the plurality of data items.

12. The method of claim 1, further comprising:

encrypting, by the first electronic device, each data item of the plurality of data items prior to storing each data item in the storage device.

13. The method of claim 1, wherein a password is required to unlock the first data item at the remote electronic device.

14. The method of claim 1, wherein the remote electronic device is a mobile device, wherein a second data item of the plurality of data items is a gift card for a store, and wherein the method further comprises:

determining, by the first electronic device in accordance with the determined location of the remote electronic device, that the remote electronic device is within a threshold proximity of the store; and sending, by the first electronic device, a notification to the remote electronic device that the second data item is a gift card for the store.

15. The method of claim 1, wherein the remote electronic device is a mobile device and wherein the method further comprises:

determining, by the first electronic device in accordance with the determined location of the remote electronic device, that the remote electronic device is within a threshold proximity of a store;

identifying, by the first electronic device, warning information about the store; and sending, by the first electronic device, a notification to the remote electronic device comprising the warning information about the store.

16. The method of claim 1, wherein:

the authentication information comprises an expiring password.

17. The method of claim 1, further comprising:

receiving, by the first electronic device, a lockdown code; and denying, by the first electronic device, all requests for data items until the first electronic device receives an unlock code.

18. The method of claim 1, wherein determining that the remote electronic device is at a location physically remote from the first electronic device comprises determining that the remote electronic device is in communication with the first electronic device via at least one remote router.

* * * * *